United States Patent
Scipio et al.

(10) Patent No.: US 9,759,131 B2
(45) Date of Patent: *Sep. 12, 2017

(54) GAS TURBINE ENGINE SYSTEMS AND METHODS FOR IMPARTING CORROSION RESISTANCE TO GAS TURBINE ENGINES

(71) Applicant: General Electric Company, Schenectady, NY (US)

(72) Inventors: Alston Ilford Scipio, Mableton, GA (US); Dale Joel Davis, Greenville, SC (US); Sanji Ekanayake, Mableton, GA (US); Paul Robert Fernandez, Woodstock, GA (US)

(73) Assignee: General Electric Company, Schenectady, NY (US)

( * ) Notice: Subject to any disclaimer, the term of this patent is extended or adjusted under 35 U.S.C. 154(b) by 437 days.

This patent is subject to a terminal disclaimer.

(21) Appl. No.: 14/098,924

(22) Filed: Dec. 6, 2013

(65) Prior Publication Data

US 2015/0159557 A1 Jun. 11, 2015

(51) Int. Cl.
*F02C 7/30* (2006.01)
*F01D 25/00* (2006.01)
(Continued)

(52) U.S. Cl.
CPC .............. *F02C 7/30* (2013.01); *F01D 25/002* (2013.01); *F01D 25/007* (2013.01); *F01D 5/288* (2013.01);
(Continued)

(58) Field of Classification Search
CPC .. F02C 7/30; F02C 6/08; F01D 25/002; F01D 25/007; F01D 5/28; F01D 5/288; F05D 2260/95; C11D 1/40
See application file for complete search history.

(56) References Cited

U.S. PATENT DOCUMENTS

| 2,846,325 A | 8/1958 | Bennett et al. |
| 3,357,868 A | 12/1967 | Tanczyn |

(Continued)

FOREIGN PATENT DOCUMENTS

| CN | 101776010 A | 7/2010 |
| CN | 103216471 A | 7/2013 |

(Continued)

OTHER PUBLICATIONS

Unofficial English translation of Office Action issued in connection with corresponding CN Application No. 201410739318.1 on Mar. 27, 2017.

*Primary Examiner* — Pascal M Bui Pho
*Assistant Examiner* — Alain Chau
(74) *Attorney, Agent, or Firm* — Ernest G. Cusick; Frank A. Landgraff

(57) ABSTRACT

Methods and systems for imparting corrosion resistance to gas turbine engines are disclosed. Existing and/or supplemental piping is connected to existing compressor section air extraction piping and turbine section cooling air piping to supply water and anti-corrosion agents into areas of the gas turbine engine not ordinarily and/or directly accessible by injection of cleaning agents into the bellmouth of the turbine alone and/or repair methods. An anti-corrosion mixture is selectively supplied as an aqueous solution to the compressor and/or the turbine sections of the gas turbine engine to coat the gas turbine engine components therein with a metal passivation coating which mitigates corrosion in the gas turbine engine.

22 Claims, 5 Drawing Sheets

(51) Int. Cl.
*F01D 5/28* (2006.01)
*F02C 6/08* (2006.01)

(52) U.S. Cl.
CPC ............ *F02C 6/08* (2013.01); *F05D 2210/20* (2013.01); *F05D 2260/95* (2013.01)

(56) References Cited

U.S. PATENT DOCUMENTS

| | | | |
|---|---|---|---|
| 4,562,042 A | 12/1985 | Moran | |
| 5,279,760 A * | 1/1994 | Sato | C11D 3/2068 510/109 |
| 6,491,048 B1 | 12/2002 | Foster | |
| 6,630,198 B2 | 10/2003 | Ackerman et al. | |
| 6,656,602 B1 | 12/2003 | Ishikawa et al. | |
| 6,659,715 B2 | 12/2003 | Kuesters et al. | |
| 7,712,301 B1 * | 5/2010 | Wagner | F01D 25/002 134/23 |
| 8,197,613 B2 | 6/2012 | Kerber | |
| 8,268,134 B2 | 9/2012 | Goller et al. | |
| 8,998,567 B2 * | 4/2015 | Scipio | F01D 25/002 415/116 |
| 9,376,931 B2 | 6/2016 | Iyer et al. | |
| 2002/0129837 A1 | 9/2002 | Ruiz et al. | |
| 2002/0137872 A1 | 9/2002 | Schneider et al. | |
| 2002/0141882 A1 | 10/2002 | Ingistov et al. | |
| 2004/0026261 A1 | 2/2004 | Stoffer et al. | |
| 2006/0062911 A1 * | 3/2006 | Medford | C23F 11/00 427/237 |
| 2006/0292374 A1 | 12/2006 | Chasser et al. | |
| 2008/0250769 A1 * | 10/2008 | Wagner | F01D 25/002 60/39.24 |
| 2009/0158739 A1 | 6/2009 | Messmer | |
| 2010/0242490 A1 * | 9/2010 | Symonds | F01D 25/002 60/775 |
| 2010/0303670 A1 * | 12/2010 | Odle | B01J 19/002 422/9 |
| 2011/0147219 A1 * | 6/2011 | Lambourne | C25D 11/18 205/50 |
| 2012/0145187 A1 | 6/2012 | Abe et al. | |
| 2012/0251742 A1 | 10/2012 | Kerber | |
| 2013/0186435 A1 | 7/2013 | Saha et al. | |
| 2014/0124007 A1 | 5/2014 | Scipio et al. | |
| 2015/0159556 A1 * | 6/2015 | Scipio | F01D 25/002 60/775 |

FOREIGN PATENT DOCUMENTS

| | | | |
|---|---|---|---|
| CN | 103225544 A | 7/2013 | |
| DE | EP 1557539 A1 * | 7/2005 | ........... F01D 25/002 |
| EP | 0674024 A2 | 9/1995 | |
| EP | 2388357 A2 | 11/2011 | |

\* cited by examiner

GAS TURBINE ENGINE SYSTEMS AND METHODS FOR IMPARTING CORROSION RESISTANCE TO GAS TURBINE ENGINES

BACKGROUND OF THE INVENTION

The subject matter disclosed herein generally relates to turbines, such as those which are used for power generation, and, more specifically, to a method and system for imparting corrosion resistance to gas turbines.

Turbines which are used for power generation utilize a variety a different types of fuels, such as natural or synthetic gas, and atomized liquid fuels of various weights and viscosities. An example of such a turbine is a gas turbine engine.

Turbines, and the components therein (e.g., turbine blades), are subjected over time to environmental conditions which eventually lead to impact damage due to dust and debris and/or the build-up of deposits of various residues formed from by-products of the combustion. As a result, varying degrees of damage to the blades and vanes of the air compressor section and/or turbine section are sustained. The resulting damage ranges from pitting to major physical damage, for example, foreign object damage, corrosion, tip erosion, trailing edge thinning and/or stator vane root erosion. Such damage results in a loss of turbine efficiency and/or degradation of turbine components.

While various washing methods are utilized to remove accumulated deposits which lead to damage such as corrosion, these methods are ineffective in cleaning the latter stages of the compressor section and the downstream turbine section of the gas turbine. The damage sustained to the gas turbine engine components is often repaired by blending, polishing and/or grinding techniques during off-line maintenance and/or repair of the gas turbine engine. However, pits, cracks and craters cannot be adequately repaired by blending. Other techniques involve significant structural modification to repair the damaged areas, and may adversely affect the operation of the gas turbine component. If left untreated, pits and craters promote relatively rapid crack propagation and accelerate corrosion of the affected turbine component(s). In addition, such repair methods are incapable of directly accessing difficult to access regions of the gas turbine without significant disassembly and re-assembly. Such repair methods also suffer from limitations in that a significant amount of additional equipment is employed, increasing capital and labor costs.

Therefore, a need exists for a system, and a method related thereto, which impart corrosion resistance to gas turbines in order to address one or more of the foregoing challenges.

BRIEF DESCRIPTION OF THE INVENTION

According to one aspect of the invention, a gas turbine engine system comprising a gas turbine engine, the gas turbine engine having a compressor section, a combustion system, a turbine section, compressor section air extraction piping and turbine section cooling air piping; water supply piping, the water supply piping being in fluid communication with a supply of water; anti-corrosion agent supply piping, the anti-corrosion agent supply piping being in fluid communication with a supply of an anti-corrosion agent which is an amine-based (e.g., polyamine) corrosion inhibitor; a mixing chamber, the mixing chamber being in fluid communication with the water supply piping and the anti-corrosion agent supply piping, the mixing chamber being configured to receive water from the water supply piping and the anti-corrosion agent from the anti-corrosion agent supply piping to produce an anti-corrosion mixture, the anti-corrosion mixture being a mixture of the anti-corrosion agent and water; and anti-corrosion mixture supply piping, the anti-corrosion mixture supply piping being in fluid communication with the mixing chamber and the compressor section air extraction piping and the turbine section cooling air piping to selectively supply the anti-corrosion mixture to the compressor section and/or the turbine section of the gas turbine engine, wherein the anti-corrosion mixture is introduced into the compressor section or turbine section of the gas turbine engine as an aqueous solution.

According to another aspect of the invention, a method for imparting corrosion resistance to a gas turbine engine comprising supplying water from a water supply to a mixing chamber via water supply piping; supplying an anti-corrosion agent from an anti-corrosion agent supply to the mixing chamber via anti-corrosion agent supply piping, the anti-corrosion agent being a polyamine corrosion inhibitor; mixing the water and the anti-corrosion agent in the mixing chamber to form an anti-corrosion mixture; transporting the anti-corrosion mixture to a compressor section of the gas turbine engine and/or a turbine section of the gas turbine engine via anti-corrosion mixture supply piping and compressor section air extraction piping and/or turbine section cooling air piping; injecting an aqueous solution of the anti-corrosion mixture into the compressor section of the gas turbine engine and/or the turbine section of the gas turbine engine; and coating at least a portion of the compressor section and/or the turbine section of the gas turbine engine with the anti-corrosion mixture.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 5 is a schematic illustration of a gas turbine engine system having a piping arrangement for delivering water, a cleaning agent and/or an anti-corrosion agent into the gas turbine engine, including control aspects and a control system.

The detailed description explains embodiments of the invention, together with advantages and features, by way of example with reference to the drawings.

DETAILED DESCRIPTION OF THE INVENTION

Disclosed herein is a system for imparting corrosion resistance to gas turbine engines. An anti-corrosion mixture comprising an anti-corrosion agent and water is selectively supplied as an aqueous solution (e.g., using water as a liquid carrier) to the compressor and/or the turbine sections of the gas turbine engine to coat the gas turbine engine components therein with a metal passivation coating which mitigates corrosion. Existing and/or supplemental piping is connected to existing compressor section air extraction and turbine section cooling air piping (e.g., cooling ports) to supply water and the anti-corrosion agent into areas of the gas turbine engine not ordinarily and/or directly accessible by injection of anti-corrosion agents into the bellmouth of the turbine alone and/or repair methods. In an embodiment, the anti-corrosion mixture is selectively supplied to the gas turbine engine as a post-wash anti-corrosion treatment procedure following the selective supply of a cleaning mixture comprising a cleaning agent and water.

Figure 1:
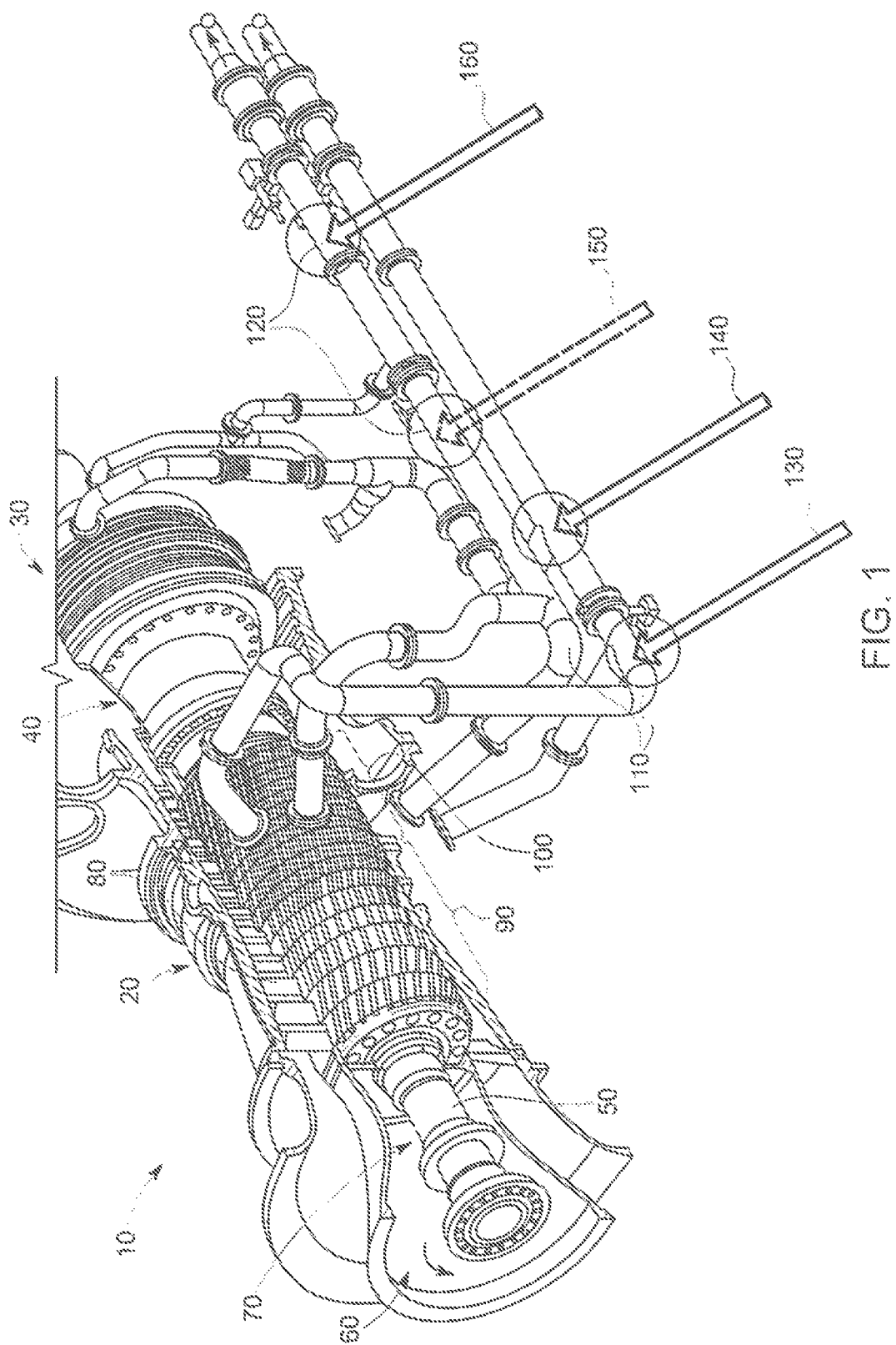
FIG. 1 is schematic side elevation view, in section, of a compressor section and a turbine section of a gas turbine engine.

Referring to FIG. 1, a schematic side elevation view, in section, of a gas turbine engine 10 is shown. The gas turbine engine 10 comprises a compressor section 20 (including a compressor) and a turbine section 30. The gas turbine engine 10 further comprises a combustion system 40 and a compressor/turbine shaft 50 (also referred to as a rotor 50).

In operation, air flows through the compressor section 20 such that compressed air is supplied to the combustion system 40. Fuel (e.g., gas) is channeled to a combustion zone (not shown) located within the combustion system 40 wherein the fuel is mixed with air and ignited. Combustion gases generated therefrom are channeled to the turbine section 30 wherein gas stream thermal energy is converted to mechanical rotational energy. The turbine section 30 is rotatably coupled to the shaft 50.

The gas turbine engine 10 further comprises a compressor bellmouth 60, inlet guide vanes 70 (not shown), and compressor stator vanes 80 (e.g., rotating blades or airfoils). The compressor section 20 comprises several stages (18 stages are shown) which are divided into a fore region 90 of the compressor section 20 (e.g., the first seven or fewer stages) and an aft region 100 of the compressor section 20 (e.g. stages 8-18). The compressor stator vanes 80 are shown as having a decreasing annulus from the fore region 90 of the compressor section 20 to the aft region 100 of the compressor section 20.

The gas turbine engine 10 further comprises compressor section air extraction piping 110 and turbine section cooling air piping 120. The compressor section air extraction piping 110 comprises 9th stage compressor air extraction piping 130 and 13th stage compressor air extraction piping 140. The turbine section cooling air piping 120 comprises 2nd stage turbine cooling air piping 150 and 3rd stage turbine cooling air piping 160.

The bellmouth 60 (R0 stage), 9th stage compressor air extraction piping 130, 13th stage compressor air extraction piping 140, 2nd stage turbine cooling air piping 150 and 3rd stage turbine cooling air piping 160 represent the locations for entry (interface) points for the selective supply of the anti-corrosion agent, water and/or cleaning agents into the compressor section 20 and the turbine section 30 of the gas turbine engine 10, as discussed in further detail below. The cleaning mixture and/or anti-corrosion mixture are introduced into the gas turbine engine 10 via the supply piping and entry points described herein. The entry points described herein allow for the anti-corrosion mixture to directly access and treat the compressor section 20 and turbine section 30 without the limitations of a comparative treatment fluid which migrates from the compressor section to the turbine section in order to eventually access the turbine section.

Although the entry points are illustrated at the particularly selected stages identified above, in another embodiment, the entry points are selected to introduce the cleaning mixture and/or the anti-corrosion mixture at alternative or additional stages in the gas turbine engine 10.

Figure 2:
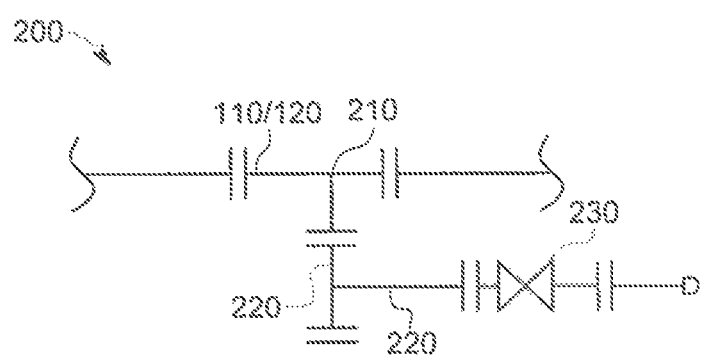
FIG. 2 is a schematic illustration of an entry (or interface) point for the selective supply of an anti-corrosion agent, water and/or a cleaning agent into the existing gas engine turbine piping depicted in FIG. 1.

Referring to FIG. 2, a schematic illustration of an entry (or interface) point for the selective supply of the anti-corrosion agent, water and/or a cleaning agent into the existing gas engine turbine piping in a gas turbine engine system 200 is shown (e.g., corresponding to any one of the entry points in the compressor section air extraction piping 110 and the turbine section cooling air piping 120 shown in FIG. 1). An entry point 210 is positioned in the compressor section air extraction piping 110 and/or the turbine section cooling air piping 120 (e.g., the 9th stage compressor air extraction piping 130, 13th stage compressor cooling air piping 140, 2nd stage turbine cooling air piping 150 and/or 3rd stage turbine cooling air piping 160). The gas engine turbine system 200 further comprises supply piping 220 to supply the anti-corrosion mixture to the entry point 210 of the gas turbine engine 10, as discussed in further detail below in regard to FIG. 3. In an embodiment, the gas engine turbine system 200 further comprises one or more valves 230, which selectively supply the anti-corrosion mixture to one or more additional entry points in the compressor section air extraction piping 110 and the turbine section cooling air piping 120, as also discussed below with regard to FIG. 3.

Figure 3:
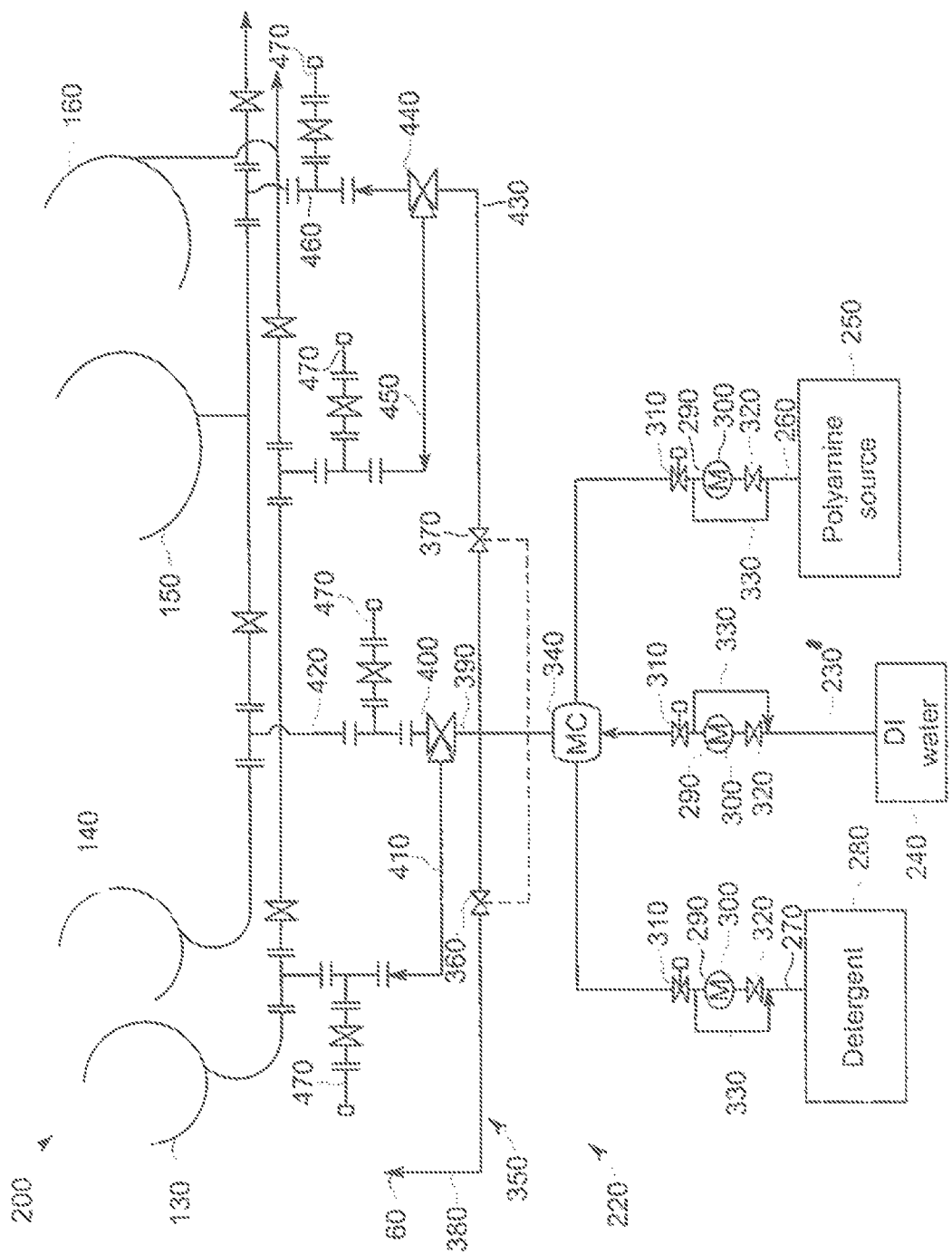
FIG. 3 is a schematic illustration of a gas turbine engine system having a piping arrangement for delivering water, a cleaning agent and/or an anti-corrosion agent into the gas turbine engine, including control aspects.

Referring to FIG. 3, a schematic illustration of a gas turbine engine system 200 for imparting corrosion resistance to the gas turbine engine 10 is shown. In an embodiment, the gas turbine engine system 200 is configured for selectively supplying an anti-corrosion treatment comprising a mixture of an anti-corrosion agent and water to the gas turbine engine 10 when the gas turbine engine 10 is off-line (not burning fuel or supplying power). In an embodiment, a cleaning mixture comprising water and a cleaning agent is selectively supplied to the gas turbine engine 10 prior to selectively supplying the anti-corrosion treatment to the gas turbine engine 10. In another embodiment, the cleaning mixture comprising water and a cleaning agent and the anti-corrosion mixture are selectively and simultaneously supplied to the gas turbine engine 10 (e.g, at the same time and at the same or different entry points).

The gas turbine engine system 200 comprises supply piping 220 for supplying water, the cleaning agent and/or the anti-corrosion agent into the gas turbine engine 10. The gas engine turbine 10 is connected to a turning gear and a driving motor (not shown). The gas turbine engine 10 is permitted to cool down until the interior volume and surfaces have cooled down to a temperature at or below 145° F. so that the water, the cleaning agent and/or the anti-corrosion agent being introduced into the gas engine turbine 10 will not thermally shock the internal metal and induce creep, or induce any mechanical or structural deformation of the material.

In the gas turbine engine system 200, supply piping 220 is connected to existing gas turbine engine piping already present in conventional gas turbine engine constructions (as depicted in FIG. 1 and FIG. 2). Supply piping 220 is connected to existing compressor section air extraction piping 110 (not shown), at entry points corresponding to the 9th stage compressor air extraction piping 130 and the 13th stage compressor air extraction piping 140. Supply piping 220 is also connected to existing turbine section air cooling air piping 120 (not shown), at entry points corresponding to the 2nd stage turbine air cooling air piping 150 and 3rd stage turbine cooling air piping 160. The following additional piping arrangements are employed in conjunction with, or as an alternative to, the use of nozzles in the bellmouth 60 (as described above with regard to FIG. 1) as an entry point for the introduction of water, the cleaning agent and/or the anti-corrosion agent into the gas turbine engine 10.

As shown in FIG. 3, supply piping 220 includes water supply piping 230' connected to a source of water 240 (e.g., deionized water) and anti-corrosion agent supply piping 260 connected to a source or sources of the anti-corrosion agent 250.

In an embodiment, the supply piping 220 further includes piping for the selective supply of a cleaning mixture to the gas turbine engine 10 prior to the selective supply of the anti-corrosion mixture to the gas turbine engine 10. Supply piping 220 further comprises cleaning agent supply piping 270 connected to a source or sources of the cleaning agent 280 (e.g., one or more detergents).

Magnesium sulfate is used as an optional, additional cleaning agent. For applications in which the gas turbine engine 10 employs heavy oil as a fuel, the heavy oil is conventionally treated with a vanadium-based corrosion/deposit inhibitor, which forms slag in the gas turbine engine 10 during operation. Magnesium sulfate helps prevent the formation of vanadium-based slag promoted by the use of crude, heavy oils as a fuel. Supply piping 220 optionally includes magnesium sulfate piping (not shown) connected to a supply of a water-based magnesium sulfate solution.

Each of the water supply piping 230, anti-corrosion agent supply piping 260, cleaning agent supply piping 270, and optional magnesium sulfate supply piping (not shown) includes a pump 290 having a motor 300, as well as valves 310, 320 and return flow circuits 330. Additional valves (not shown) are employed to enable selection between different sources of the cleaning agent(s) and/or the anti-corrosion agent(s), e.g., for selectively cleaning or treating the compressor section 20 and/or the turbine section 30 of the gas turbine engine 10, or portions thereof.

In an embodiment, the water supply piping 230, cleaning agent supply piping 270 (if present), anti-corrosion agent supply piping 260, and optional magnesium sulfate piping (not shown) lead into a mixing chamber 340 (or a second, separate mixing chamber, as discussed below). The mixing chamber 340 is used to mix the cleaning agent (and magnesium sulfate, if present) and water to produce the cleaning mixture, or to mix the anti-corrosion agent and water to produce the anti-corrosion mixture, respectively. The cleaning mixture and/or the anti-corrosion mixture (depending on the system operation mode) is then routed to supply piping 220 downstream of the first mixing chamber 340.

Figure 4:
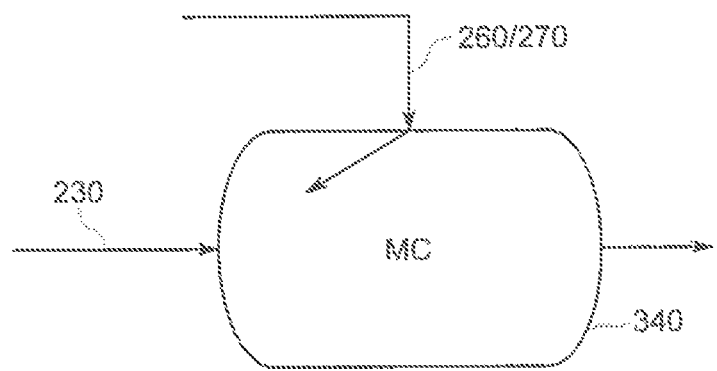
FIG. 4 is a schematic illustration of a mixing chamber.
Figure 6:
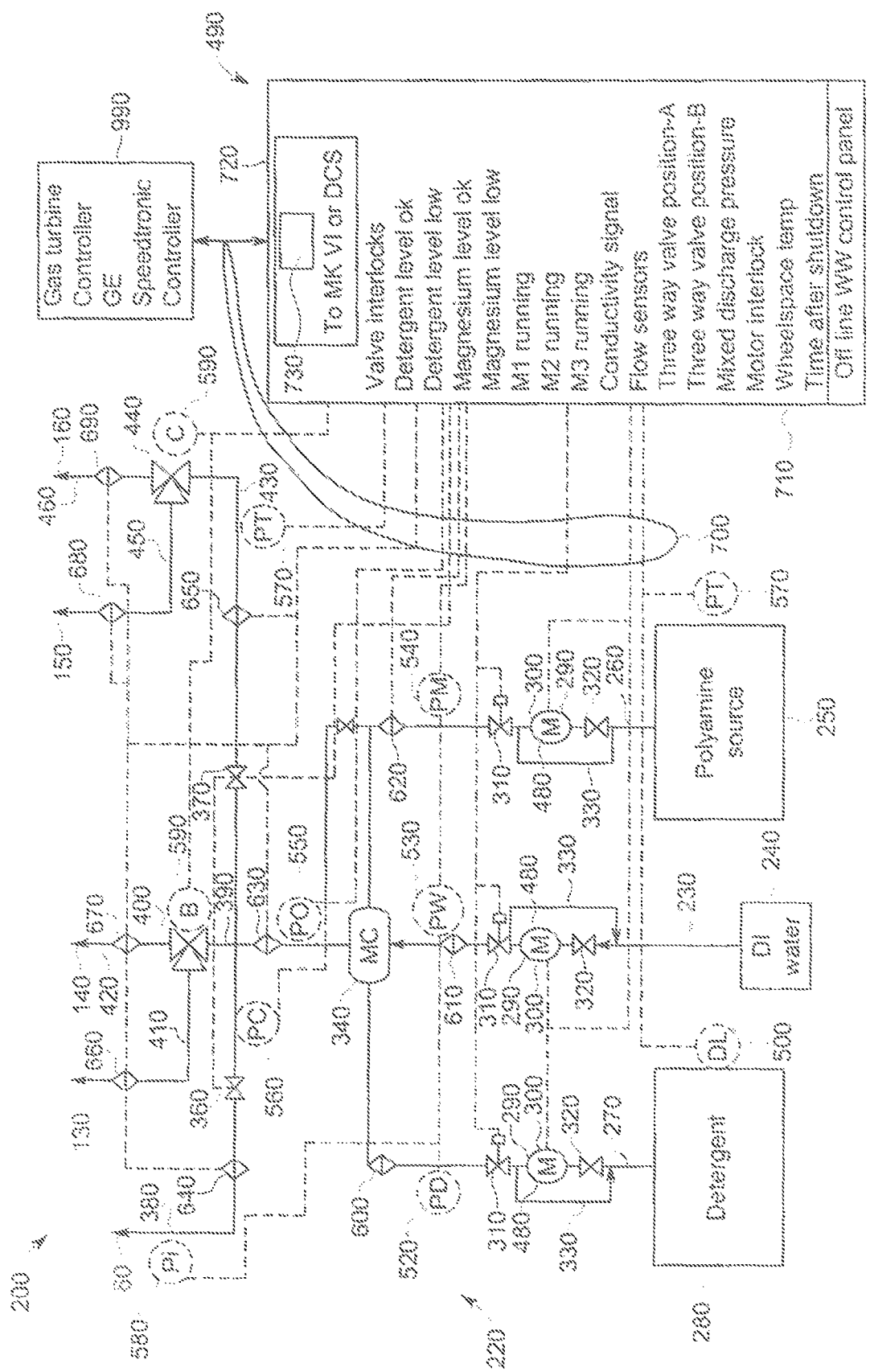

As shown in FIG. 4, in the mixing chamber 340 (or another, separate mixing chamber), the water supplied from the water supply piping 230 forms a primary stream, and the anti-corrosion agent supplied from the anti-corrosion agent supply piping 260 forms a secondary stream which is directed (or injected) into, or toward the entry point of, the primary water stream at a predetermined angle to ensure thorough mixing, forming the anti-corrosion mixture. Similarly, for pre-anti-corrosion treatment cleaning, the water from the water supply piping 230 forms the primary stream in the mixing chamber 340 and the cleaning agent supplied from the cleaning agent supply piping 270 and optional magnesium sulfate form secondary streams which are directed into, or toward the entry point of, the primary water stream at a predetermined angle to ensure thorough mixing, forming the cleaning mixture.

Referring back to FIG. 3, in another embodiment, the anti-corrosion agent is mixed with water in the mixing chamber 340 and the cleaning agent (and magnesium sulfate, if present) is mixed with water in a separate, second mixing chamber (e.g., the cleaning agent supply source 280, the anti-corrosion agent supply 250 or a separate mixing chamber downstream thereof). In yet another embodiment, the anti-corrosion agent supply piping bypasses the mixing chamber 340 and delivers the anti-corrosion agent to the supply piping downstream of the mixing chamber 340. The anti-corrosion agent is then mixed in with the water (being supplied from the water supply piping 230) in the supply piping 220 downstream of the mixing chamber, prior to being supplied to the gas turbine engine 10.

In an embodiment, the anti-corrosion mixture is pre-mixed and supplied to the gas turbine engine 10 from the anti-corrosion agent supply or an external source (e.g. a tank or tanker truck). The pre-mixed anti-corrosion mixture bypasses the first mixing chamber 340 (which is used for mixing the cleaning mixture) and is supplied to supply piping 220 downstream of the mixing chamber 340.

In another embodiment, supply piping downstream of the first mixing chamber 340 (which is used for mixing the cleaning mixture) acts as a second mixing chamber wherein the anti-corrosion agent is mixed with water supplied from the water supply to form the anti-corrosion mixture, e.g. in the supply piping 220 disposed between the mixing chamber 340 and the manifold 350. One or more valves is employed to selectively employ the second mixing chamber or to utilize the first mixing chamber for mixing the cleaning mixture and the anti-corrosion mixture, respectively, at separate times.

The anti-corrosion mixture imparts corrosion resistance and/or inhibition to the gas turbine engine 10 by using metal passivation to provide an anti-corrosion coating on the metal and/or metal alloy substrates in the gas turbine engine 10 with which the anti-corrosion mixture comes into contact via the entry points at the bellmouth 60, in the compressor section 20 and in turbine section 30 discussed above. The resultant anti-corrosion coating therefore (partially or fully) coats all stages of the compressor section 20 (including the bellmouth 60) and/or turbine section 30 the gas turbine engine 10, and various metallic components therein (e.g., compressor blades and stator vanes).

Metal passivation imparts a protective shield to metal and/or metal alloy substrates from environmental factors (e.g., high temperatures, combustion by-products, debris, etc.) exhibited in gas turbine engines by forming a coating (e.g., a metal oxide layer) which protects the metal or metal alloy substrate from corrosive species. The anti-corrosion coating is a molecular layer—(e.g, a micro-coating). In an embodiment, the anti-corrosion coating also serves to strengthen the bonds in the metal or metal alloy substrate of the gas turbine engine 10. In another embodiment, significant thermal decomposition of the anti-corrosion coating is not exhibited at temperatures below 500° C. In yet another embodiment, successive anti-corrosion treatment cycles are applied to the gas turbine engine using the gas turbine engine system 200 described herein, resulting in a multi-layer anti-corrosion coating.

The anti-corrosion mixture comprises water and an anti-corrosion agent in a particularly selected, predetermined ratio. Any anti-corrosion agent that is suitable to impart an anti-corrosion coating in a gas turbine engine may be employed. In an embodiment, the anti-corrosion agent is an organic amine, which acts as a corrosion inhibitor by adsorbing at the metal/metal oxide surface of components in the gas turbine engine 10, thereby restricting the access of potentially corrosive species (e.g., dissolved oxygen, carbonic acid, chloride/sulfate anions, etc.) to the metal or metal alloy substrate surface of the gas turbine engine component. In another embodiment, the anti-corrosion agent is two or more organic amines. In yet another embodiment, the anti-corrosion inhibitor is a polyamine. As used herein, the term "polyamine" is used to refer to an organic compound having two or more primary amino groups —$NH_2$. In still another embodiment, the anti-corrosion agent further comprises a volatile neutralizing amine which neutralizes acidic contaminants and elevates the pH into an alkaline range, and with which protective metal oxide coatings are particularly stable and adherent.

Non-limiting examples of the anti-corrosion agent include cycloheaxylamine, morpholine, monoethanolamine, N-9-Octadecenyl-1,3-propanediamine, 9-octadecen-1-amine, (Z)-1-5, dimethylaminepropylamine (DMPA), diethylaminoethanol (DEAE), and the like, and combination comprising at least one of the foregoing.

In an embodiment, the amount of the anti-corrosion agent in the anti-corrosion mixture is from 5 ppm to 1000 ppm. In another embodiment, the amount of the anti-corrosion agent in the anti-corrosion mixture is from 50 ppm to 800 ppm. In yet another embodiment, the amount of the anti-corrosion agent in the anti-corrosion mixture is from 100 ppm to 500 ppm.

In an embodiment, the amount of the anti-corrosion agent in a first anti-corrosion mixture supplied to the bellmouth 60 or the compressor section 20 is from 5 ppm to 1000 ppm and the amount of the anti-corrosion agent in a second anti-corrosion mixture supplied to the turbine section 30 is from 5 ppm to 1000 ppm.

The anti-corrosion mixture comprising water and the anti-corrosion agent is introduced into the gas turbine engine 10 via the entry points discussed above as an aqueous solution. As used herein, the term "aqueous solution" refers to a liquid phase medium. In an embodiment, the aqueous solution is a liquid phase medium which is devoid of polyamine gas, water vapor (e.g., steam) and/or air. The water acts as a liquid carrier for the anti-corrosion agent, which is also in a liquid phase. The water thus carries the anti-corrosion agent through the supply piping 220 and into the selected regions of the gas turbine engine 10, coating the components therein with the anti-corrosion coating.

From the mixing chamber 340, or from a separate mixing chamber (if present), e.g., the anti-corrosion agent supply 250, the anti-corrosion mixture (comprising the anti-corrosion agent mixed with water in a predetermined ratio) is directed to a manifold 350, which controls the outflow from the mixing chamber 340. The manifold 350 includes interlocked valves 360, 370, which, in an embodiment, are controlled so that only one or the other of valves 360, 370 is open at any given time (though both of valves 360, 370 can be closed simultaneously). In another embodiment, valves 360, 370 are separately and independently controllable.

From the manifold 350, turbine bellmouth (branch) supply piping 380 delivers the anti-corrosion mixture to the bellmouth 60 of the gas turbine engine 10 (when the appropriate valves are suitably configured). Similarly, an anti-corrosion mixture supply line 390 leads to a three-way valve 400, which, in turn, leads to anti-corrosion mixture supply branches 410, 420 to supply the anti-corrosion mixture to the 9th compressor stage air extraction piping 130 and/or the 13th compressor stage air extraction piping 140, respectively. In an embodiment, branches 410 and 420 are each provided with optional quick disconnects 470, which are employed when specialty cleaning agents, anti-corrosion agents or an external source (e.g., a tank or tanker truck) thereof are employed. Anti-corrosion mixture supply piping 430 extends from manifold 350 to three-way valve 440, and on to anti-corrosion mixture supply branches 450, 460 to supply the anti-corrosion mixture to the 2nd turbine stage cooling air piping 150 and/or the 3rd turbine stage cooling air piping 160, respectively. In an embodiment, branches 450, 460 are likewise provided with quick disconnects 470 for use when specialty cleaning agents and/or antic-corrosion agents and/or an external source thereof are employed.

The anti-corrosion mixture is selectively supplied by directly delivering the anti-corrosion mixture to targeted regions within the gas turbine engine 10. In an embodiment, the anti-corrosion mixture is simultaneously supplied to the compressor section 20 (e.g., the 9th stage and/or 13th stage compressor air extraction piping) and the turbine section 30 (e.g., the 2nd stage turbine cooling air piping and/or the 3rd stage turbine cooling air piping) of the gas turbine engine 10. In another embodiment, the anti-corrosion mixture is simultaneously supplied to the bellmouth 60, the compressor section 20 (e.g., the 9th stage and/or 13th stage compressor air extraction piping) and the turbine section 30 (e.g., the 2nd stage turbine cooling air piping and/or the 3rd stage turbine cooling air piping) of the gas turbine engine 10. In yet another embodiment, the anti-corrosion mixture is supplied to the bellmouth 60, the compressor section 20 and/or the turbine section 30 of the gas turbine engine at different times.

In still another embodiment, a first anti-corrosion mixture is supplied to the bellmouth 60 and/or compressor section 20 of the gas turbine engine 10 and a second anti-corrosion mixture is supplied to the turbine section 30 at a different time, and further the ratio of the anti-corrosion agent to water in the first anti-corrosion mixture is different than the ratio of the anti-corrosion agent to water in the second anti-corrosion mixture. As discussed above, the particular ratio of the anti-corrosion agent (comprising a polyamine) and water is selected according to the particular materials of the targeted gas turbine engine components as well as the particular application conditions. By tailoring the specific ratio of the anti-corrosion agent to water used in the anti-corrosion mixture, the efficiency and/or effectiveness of the selectively supplied anti-corrosion mixture is increased.

In an embodiment, the manifold 350 and valves 360, 370 described above are also similarly used to selectively supply the cleaning mixture (not shown) from the mixing chamber 340 to the gas turbine engine 10 via the same supply piping 220 configuration described above. In an embodiment, as discussed above, the anti-corrosion mixture is selectively supplied to the gas turbine engine 10 as a post-washing procedure which follows a separate cleaning cycle using the cleaning mixture.

The system 200 is manually or automatically operated as desired by the user and as appropriate for the particular application or mode of operation when the gas-turbine engine is off-line. For automated operation of the system 200, control aspects and a control system are provided. The control system is suitably programmed so that an operator is not capable of making alterations to the ratio of the anti-corrosion agent and/or the cleaning agent to water, the cycle times for wash and/or anti-corrosion treatment sequences, or the order of steps in wash, rinse or anti-corrosion treatment cycles. In an embodiment, such aspects of the cleaning and/or anti-corrosion treatment methods will be selected by the turbine manufacturer to accommodate the particular specifications and configuration of the gas engine turbine 10 being treated with the cleaning agent, water and/or the anti-corrosion agent.

FIG. 5 is a schematic illustration of the gas turbine engine system 200, which further includes control aspects and a control system 490. The gas turbine engine system 200 incorporates the same piping arrangements as shown in FIG. 3, and accordingly, similar components performing similar functions, as in system 200 of FIG. 3 are given similar reference numerals. Alternate embodiments of anti-corrosion agent supply piping are shown in FIG. 5 in which the anti-corrosion agent supply piping either supplies the anti-corrosion agent to the mixing chamber 340 or to supply piping 220 downstream of the mixing chamber 340 (e.g., if the anti-corrosion mixture is pre-mixed or the supply piping acts as a mixing chamber), as discussed above with regard to FIG. 3.

The gas turbine system 200 and control system 490 include motor sensors 480 that sense the operation of pumps 290 positioned in the cleaning agent supply piping 270, the water supply piping 230, the anti-corrosion agent supply piping 260 and the optional magnesium sulfate supply piping (not shown), respectively.

The control system 490 further includes cleaning agent level sensor 500, anti-corrosion agent level sensor 510, an optional magnesium sulfate level sensor (not shown), cleaning agent pressure sensor 520, water pressure sensor 530, optional magnesium sulfate pressure sensor (not shown), anti-corrosion agent pressure sensor 540, cleaning mixture and/or anti-corrosion mixture outflow pressure sensor 550, compressor supply manifold line pressure sensor 560 (which senses pressure in lines to the compressor section 20 of the gas turbine engine 10), turbine supply manifold line pressure sensor 570 (which senses pressure in lines to turbine section 30 of the gas turbine engine 10), inlet pressure sensor 580 (which senses pressure in branch 380 to bellmouth 60), all of which sense various parameters relative to the operation of, and valve position sensors 590, associated with three-position valves 400, 440, respectively. Control system 490 further includes flow sensors 600, 610, 620, 630, 640, 650, 660, 670, 680, and 690, each of which is configured to sense the rate of flow of the water, the cleaning agent, the anti-corrosion agent, the optional magnesium sulfate (not shown), the cleaning mixture or the anti-corrosion mixture flowing (or not flowing) through their respective piping.

In an embodiment, control system 490 communicates, via communication links 700, with the various pressure, flow and position sensors described herein, and further communicates with actuation mechanisms (not shown) provided to start, stop or control the operation of motors 300, and to open, close, or regulate the position of valves 320, 310, 360, 370, 400 and 440, as required to accomplish the operations of the gas turbine engine system 200, as described herein. Communication links 700 are implemented in hardware and/or software. In one embodiment, communication links 700 remotely communicate data signals to and from the control system 490 in accordance with conventional wired or wireless communication protocol. Such data signals include, but are not limited to one including, signals indicative of operating conditions of the various sensors transmitted to the control system 490 and/or various command signals communicated by the control system 490 to the sensors shown in FIG. 5, and described herein.

In an embodiment, the control system 490 is a computer system that includes a control panel/display 710, a controller 720, and at least one processor 730. The control system 490 executes programs to control the operation of the gas turbine engine system 200. User input functionality is provided in the control panel/display 710, which acts as a user input selection device, as well as a display of the operating conditions of the various components of the gas turbine engine system to control treatment (e.g., washing) protocols. For example, the control panel/display 710 provides information on and/or enable instructions to be input by operators on: status and position of valve interlocks controlling valves 360 and 370; the cleaning agent level; the anti-corrosion agent level; the magnesium sulfate level status (optional); operation status of pump motors 300 via the motor sensors 480; the conductivity of the used cleaning mixture exiting the gas turbine engine 10; the conductivity of the used anti-corrosion mixture exiting the gas turbine engine 10; the flow sensors 600, 610, 620, 630, 640, 650, 660, 670, 680 and 690; the three-way valves 400, 440; the cleaning mixture and/or the anti-corrosion mixture outflow pressure sensor 550; the motors 300; the temperature of the interior/wheel space of the gas turbine engine 10; and various elapsed times, such as the duration of time after shutdown of the gas turbine engine system 200. In an embodiment, the control panel/display 710 is configured to be responsive to the user pressing on the control panel/display 710 to selectively perform functionality. In an embodiment, the control panel/display 710 also includes a keypad. Thus, the user selects and operates desired functions available with the control system 490 by contacting a surface of the control panel/display 710. Commands are generated by the control system 490, which interfaces with the controller 990 and the gas turbine engine system 200 and to activate/validate other control settings on the gas turbine engine system 200.

Each of the pressure, position, and flow sensors of control system 490 is suitably configured to provide readouts of their respective sensed values, on control panel/display 710, which is, in turn, in communication with a suitable controller 720, which incorporates one or more control processors 730. As used herein, the term processor is not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory includes, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) are utilized. Also, in the embodiments described herein, additional input channels include, but are not limited to, computer peripherals associated with an operator interface such as a mouse and a keyboard. Alternatively, other computer peripherals are employed which include, for example, but not be limited to, a scanner. Furthermore, in an embodiment, additional output channels include, but are not limited to, an operator interface monitor.

Disclosed herein too is a method for imparting corrosion resistance to the gas turbine engine 10 comprising supplying water from a water supply 240 to a mixing chamber 340; supplying an anti-corrosion agent from an anti-corrosion agent supply 250 to the mixing chamber 340; mixing the water and the anti-corrosion agent in the mixing chamber 340 to form an anti-corrosion mixture; transporting the anti-corrosion mixture to a compressor section 20 of the gas turbine engine 10 and/or a turbine section 30 of the gas turbine engine 10, injecting an aqueous solution of the anti-corrosion mixture into the compressor section 20 of the gas turbine engine 10 and/or the turbine section 30 of the gas turbine engine 10; and coating at least a portion of the compressor section 20 and/or the turbine section 30 of the gas turbine engine 10 with the anti-corrosion mixture.

In an embodiment, the anti-corrosion agent is supplied to the bellmouth 60, the compressor section 20 and/or the turbine section 30, respectively, via the supply piping 220 at the entry points described herein at turning gear speed according to a pre-determined sequence that is operated automatically by a controller 720.

After the anti-corrosion treatment sequence has run and completed, the control sequence operated by a master controller 990 is transitioned to a drying mode to drain the anti-corrosion mixture from the gas turbine engine 10 via drain valves (not shown). The drain valves are positioned to drain fluid (e.g., water and remaining anti-corrosion mixture) from the gas turbine engine system 10 into a drain system (also not shown). During the drying sequence, the turbine is set to run for a predetermined speed and time with the inlet guide vanes (IGV) set in a predetermined angular position. After the drying sequence has run and been completed, automatic and/or manual valve alignment allows the gas turbine engine 10 (and an associated power plant) to return to an on-line operation (e.g., combustion) mode.

The system and method described herein mitigate (e.g., reduce and/or inhibit) corrosion of the gas turbine engine components therein, is capable of directly accessing targeted regions or difficult to access regions of the gas turbine engine, does not require a significant amount of additional equipment, increases the efficiency of the gas turbine engine, reduces the number and/or duration of shut-downs for maintenance and/or repairs and increases the duration of time between shut-downs for maintenance and/or repairs.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A gas turbine engine system comprising:
   a gas turbine engine, the gas turbine engine having a compressor section, a combustion system, a turbine section, compressor section air extraction piping and turbine section cooling air piping;
   water supply piping, the water supply piping being in fluid communication with a supply of water;
   a supply of an anti-corrosion agent comprising a polyamine corrosion inhibitor;
   anti-corrosion agent supply piping, the anti-corrosion agent supply piping being in fluid communication with the supply of an anti-corrosion agent comprising the polyamine corrosion inhibitor;
   a mixing chamber, the mixing chamber being in fluid communication with the water supply piping and the anti-corrosion agent supply piping, the mixing chamber being configured to receive water from the water supply piping and the anti-corrosion agent from the anti-corrosion agent supply piping to produce an anti-corrosion mixture, the anti-corrosion mixture being a mixture of the anti-corrosion agent and water; and
   anti-corrosion mixture supply piping, the anti-corrosion mixture supply piping being in fluid communication with the mixing chamber and the compressor section air extraction piping and the turbine section cooling air piping to selectively supply the anti-corrosion mixture to the compressor section and/or the turbine section of the gas turbine engine, wherein the anti-corrosion mixture is introduced into the compressor section or turbine section of the gas turbine engine as an aqueous solution.

2. The gas turbine engine system of claim 1, further comprising:
   at least one pump, the at least one pump being in fluid communication with the water supply piping, the anti-corrosion agent supply piping and/or the anti-corrosion mixture supply piping; and
   a control system, the control system being in operative communication with the at least one pump and the water supply piping, the anti-corrosion agent supply piping and/or the anti-corrosion mixture supply piping, wherein the control system is configured to regulate a flow of the water, the anti-corrosion agent and/or the anti-corrosion mixture through the water supply piping, the anti-corrosion agent supply piping and/or the anti-corrosion mixture supply piping.

3. The gas turbine engine system of claim 2, wherein the control system further comprises:
   a control processor;
   a control display associated with the control processor; and
   at least one pressure sensor disposed in the water supply piping, the anti-corrosion agent supply piping and/or the anti-corrosion mixture supply piping, the at least one pressure sensor in data communication with the control processor, for sensing a pressure of the water, the anti-corrosion agent and/or the anti-corrosion mixture in the water supply piping, the anti-corrosion agent supply piping and/or the anti-corrosion mixture supply piping.

4. The gas turbine engine system of claim 3, wherein the control system further comprises:
   at least one flow control valve, positioned in the water supply piping, the anti-corrosion agent supply piping and/or the anti-corrosion mixture supply piping, the at least one flow control valve in communication with the control processor, for enabling actuation of the at least one flow control valve between at least open and closed positions, said actuation caused by the control processor; and
   at least one flow sensor, disposed in the water supply piping, the anti-corrosion agent supply piping and/or the anti-corrosion mixture supply piping, the at least one flow sensor in communication with the control processor, for sensing the flow of water, the anti-corrosion agent and/or the anti-corrosion mixture in the water supply piping, the anti-corrosion agent supply piping and/or the anti-corrosion mixture supply piping.

5. The gas turbine engine system of claim 1, wherein the anti-corrosion mixture is simultaneously supplied to the compressor section and the turbine section of the gas turbine engine.

6. The gas turbine engine system of claim 1, wherein the anti-corrosion mixture supply piping further comprises:
   an anti-corrosion mixture supply manifold, connected in fluid communication with the mixing chamber;

compressor section branch piping, connected in fluid communication with the anti-corrosion mixture supply manifold to supply the anti-corrosion mixture from the anti-corrosion mixture supply manifold to the compressor section of the gas turbine engine via the compressor section air extraction piping; and turbine section branch piping connected in fluid communication with the anti-corrosion mixture supply manifold to supply the anti-corrosion mixture from the anti-corrosion mixture supply manifold to the turbine section of the gas turbine engine via the turbine section cooling air piping.

7. The gas turbine engine system of claim 6, wherein the anti-corrosion mixture supply piping further comprises:

turbine bellmouth supply piping connected in fluid communication with the anti-corrosion mixture supply manifold to supply the anti-corrosion mixture from the anti-corrosion mixture supply manifold to a bellmouth of the gas turbine engine.

8. The gas turbine engine system of claim 6, wherein the compressor section branch piping is in fluid communication with the anti-corrosion mixture supply manifold to supply the anti-corrosion mixture from the anti-corrosion mixture supply manifold to an aft region of the compressor section of the gas turbine engine via the compressor section air extraction piping, the aft region of the compressor section of the gas turbine engine being a 9th stage and/or a 13th stage of the compressor section of the gas turbine engine.

9. The gas turbine engine system of claim 6, wherein the turbine section branch piping is in fluid communication with the anti-corrosion mixture supply manifold to supply the anti-corrosion mixture from the anti-corrosion mixture supply manifold to a 2nd stage and/or a 3rd stage of the turbine section of the gas turbine engine.

10. The gas turbine engine system of claim 1, wherein the anti-corrosion agent supply is an external tank connected to and in fluid communication with the anti-corrosion agent supply piping via one or more quick disconnects.

11. The gas turbine engine system of claim 1, further comprising:

cleaning agent supply piping, the cleaning agent supply piping being in fluid communication with a supply of a cleaning agent and the mixing chamber, the mixing chamber being configured to receive water from the water supply piping and the cleaning agent from the cleaning agent supply piping to produce a cleaning mixture; and cleaning mixture supply piping, the cleaning mixture supply piping being in fluid communication with the mixing chamber and the compressor section air extraction piping and the turbine section cooling air piping to selectively supply the cleaning mixture to the compressor section and/or the turbine section of the gas turbine engine.

12. The gas turbine engine system of claim 11, wherein the cleaning mixture is supplied to the compressor section and/or the turbine section of the gas turbine engine prior to the anti-corrosion mixture being supplied to the compressor section and/or the turbine section of the gas turbine engine.

13. The gas turbine engine system of claim 1, wherein the anti-corrosion mixture is a first anti-corrosion mixture selectively supplied to the compressor section and having an anti-corrosion agent to water ratio which is different than an anti-corrosion agent to water ratio of a second anti-corrosion mixture selectively supplied to the turbine section of the gas turbine engine.

14. The gas turbine engine system of claim 1, wherein the anti-corrosion mixture is a first anti-corrosion mixture that has an amount of anti-corrosion agent of from 5 ppm to 1000 ppm which is selectively supplied to the compressor section of the gas turbine engine and a second anti-corrosion mixture that has an anti-corrosion agent in an amount of from 5 ppm to 1000 ppm is selectively supplied to the turbine section of the gas turbine engine.

15. The gas turbine engine system of claim 1, wherein the anti-corrosion agent consisting essentially of polyamine corrosion inhibitor is selected from the group consisting of cycloheaxylamine, morpholine, monoethanolamine, N-9-Octadecenyl-1,3-propanediamine, 9-octadecen-1-amine, (Z)-1-5, dimethylaminepropylamine (DMPA), diethylaminoethanol (DEAE), and combinations thereof.

16. A method for imparting corrosion resistance to a gas turbine engine comprising:

supplying water from a water supply to a mixing chamber via water supply piping;

supplying an anti-corrosion agent from an anti-corrosion agent supply to the mixing chamber via anti-corrosion agent supply piping, the anti-corrosion agent comprising a polyamine corrosion inhibitor;

mixing the water and the anti-corrosion agent in the mixing chamber to form an anti-corrosion mixture;

transporting the anti-corrosion mixture to a compressor section of the gas turbine engine and/or a turbine section of the gas turbine engine via anti-corrosion mixture supply piping and compressor section air extraction piping and/or turbine section cooling air piping;

injecting an aqueous solution of the anti-corrosion mixture into the compressor section of the gas turbine engine and/or the turbine section of the gas turbine engine; and coating at least a portion of the compressor section and/or the turbine section of the gas turbine engine with the anti-corrosion mixture.

17. The method for imparting corrosion resistance to a gas turbine engine of claim 16, further comprising:

supplying a cleaning agent to the mixing chamber;

mixing the water and the cleaning agent in the mixing chamber to form a cleaning mixture;

transporting the cleaning mixture to the compressor section and/or the turbine section of the gas turbine engine; and injecting the cleaning mixture into the compressor section and/or the turbine section of the gas turbine engine, wherein the cleaning mixture is supplied to the compressor section and/or the turbine section of the gas turbine engine prior to the anti-corrosion mixture being supplied to the compressor section and/or the turbine section of the gas turbine engine.

18. The method for imparting corrosion resistance to a gas turbine engine of claim 16, further comprising:

connecting at least one pump in fluid communication with the water supply piping, the anti-corrosion agent supply piping, the mixing chamber, the anti-corrosion mixture supply piping, the compressor section air extraction piping and/or the turbine section cooling air piping;

connecting a control system to the at least one pump in fluid communication with the water supply piping, the anti-corrosion agent supply piping, the mixing chamber, the anti-corrosion mixture supply piping, the compressor air extraction piping and/or the turbine section cooling air piping; and regulating a flow of the water, the anti-corrosion agent and the anti-corrosion mixture through the water supply piping, the anti-corrosion agent supply piping and/or the anti-corrosion mixture piping via at least one pump and the control system.

19. The method for imparting corrosion resistance to a gas turbine engine of claim 16, wherein the anti-corrosion mixture has an anti-corrosion agent in an amount of from 5 ppm to 1000 ppm.

20. The method for imparting corrosion resistance to a gas turbine engine of claim 16, wherein the supplying the anti-corrosion mixture to the compressor section and/or the turbine section of the gas turbine engine further comprises:
connecting an anti-corrosion mixture supply manifold in fluid communication with the mixing chamber;
connecting compressor section supply branch piping in fluid communication with the anti-corrosion mixture supply manifold to supply the anti-corrosion mixture from the anti-corrosion mixture supply manifold to the compressor section of the gas turbine engine; and
connecting turbine section supply branch piping in fluid communication with the anti-corrosion mixture supply manifold to supply the anti-corrosion mixture from the anti-corrosion mixture supply manifold to the turbine section of the gas turbine engine.

21. The method for imparting corrosion resistance to a gas turbine engine of claim 20, wherein the supplying the anti-corrosion mixture to the compressor section and/or the turbine section of the gas turbine engine further comprises:
connecting turbine bellmouth supply branch piping in fluid communication with the anti-corrosion mixture supply manifold to supply the anti-corrosion mixture from the anti-corrosion mixture supply manifold to a bellmouth of the gas turbine engine.

22. The method for imparting corrosion resistance to a gas turbine engine of claim 16, wherein the anti-corrosion agent consisting essentially of polyamine corrosion inhibitor is selected from the group consisting of cycloheaxylamine, morpholine, monoethanolamine, N-9-Octadecenyl-1,3-propanediamine, 9-octadecen-1-amine, (Z)-1-5, dimethylaminepropylamine (DMPA), diethylaminoethanol (DEAE), and combinations thereof.

* * * * *